United States Patent Office 3,473,550
Patented Oct. 21, 1969

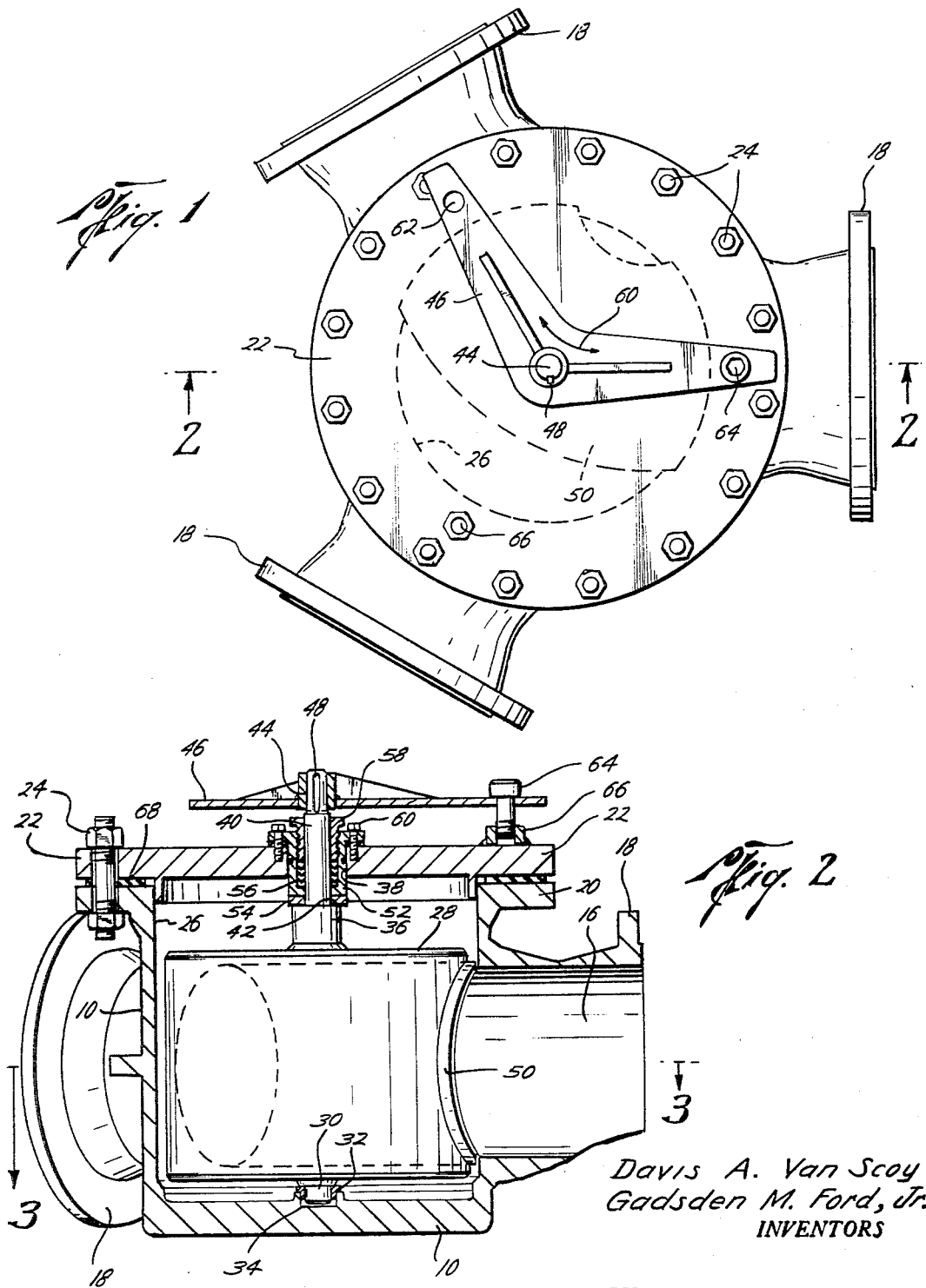

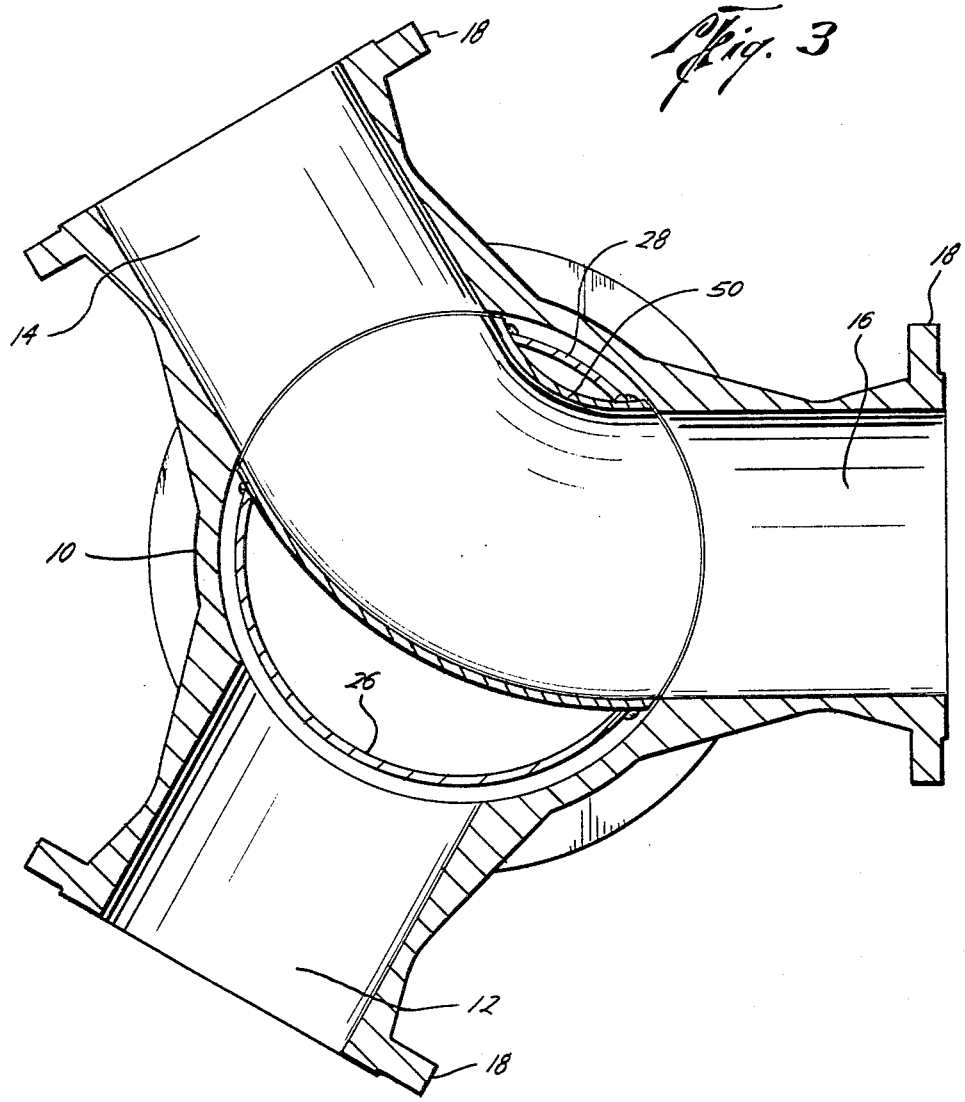

3,473,550
PIG DIVERTER
Davis A. Van Scoy and Gadsden M. Ford, Jr., Houston, Tex., assignors to Helmerich & Payne, Inc., Houston, Tex., a corporation of Delaware
Filed Mar. 29, 1967, Ser. No. 626,814
Int. Cl. F16k 11/06; B08b 9/06
U.S. Cl. 137—268                                    7 Claims

ABSTRACT OF THE DISCLOSURE

A pig diverter having three flanged ports 120° apart in a housing which contains a curved conduit adapted to be turned, by means of a shaft to which an operating handle is affixed, to connect any two of the three ports; the handle having a marker on it indicating the position of the conduit and a cap screw to lock the handle in place.

Background of the invention

This invention relates to apparatus for diverting pipeline scrapers, plugs and other devices, generically known as pigs, which are commonly used in conjunction with the transportation of fluid products by pipelines, such apparatus being particularly useful at the juncture of three or more pipelines.

In the pipeline industry, devices known as scrapers, plugs, pigs, balls, spheres, cleaners, etc. are propelled through a pipeline to scrape deposits from the inner wall thereof, or to reduce the interfacial volumes of mixture between two dissimilar fluids, or to accompany and identify an interface between two dissimilar fluids, and for many other purposes. Such devices are generically known as pigs. In order to cause the pigs to move properly through a desired pipeline, it is necessary at intersections of pipelines to put in some device to insure the proper movement of the pig. The present invention has reference to such a device which directs the movement of the pig. Various forms of such devices have been known before, as for example the form shown in U.S. Patent 3,047,020 to Barrett, Jr.

Pig diverters which have previously been available have not been able, however, to provide for movement of the pig in any direction through a pipe intersection. For example, where three pipes intersect, for full flexibility of the system the diverter should be adjustable to direct the pig in six different directions. Furthermore, in diverters previously available, substantial difficulty has been encountered in insuring that the diverter is oriented for proper movement of the pig. Another problem that has been encountered involves assurance that the pig will move through the diverter by force of fluid pressure alone.

Summary of the invention

The present invention provides a diverter for pipeline pigs which can be used at the intersection of three or more pipelines and is capable of directing the pig through the intersection in a large number of routes. This is assured, in the preferred embodiment, by equiangular spacing of ports in a housing connected to the pipelines with which a single curved conduit may be aligned to guide the pig in a desired course. The curved conduit in the preferred embodiment does not sealingly engage the housing, but is spaced away from the housing wall so as to allow some fluid flow around the outside of the conduit within the housing. However, such fluid flow is restricted so as to provide a substantial pressure differential across the device so that movement of the pig through the conduit is accomplished by force of the pressure differential. In order to insure that the conduit is properly positioned for movement of the pig in the desired direction, an operating handle is provided with means to indicate the orientation of the conduit and means are provided for locking the conduit in the desired orientation.

Brief description of the drawing

FIGURE 1 is a plan view of one embodiment of the apparatus of this invention;

FIGURE 2 is an elevational view of the embodiment of FIGURE 1 with portions shown in section for clarity; and FIGURE 3 is a horizontal sectional view of the embodiment of FIGURE 1, taken at line 3—3 of FIGURE 2.

Description of the preferred embodiment

In the embodiment shown in the drawing, a housing 10 of generally relatively flat cylindrical configuration is provided with three ports 12, 14 and 16 positioned 120° apart. Each of the three ports is formed by a pipe provided with a flange 18 for connection to a pipeline. The housing is also provided with an upper flange 20 to which a cover flange 22 is removably attached as by means of stud and nut assemblies 24, this connection being made fluid-tight by means of a pressure gasket 68.

The housing 10 forms a chamber 26 within which a body member 28 is rotatably received. The body member 28 is also of generally flat cylindrical shape having a diameter somewhat smaller than the diameter of the chamber 26 and having a height somewhat less than the height of the chamber 26. The body member 28 is provided with a downwardly extending pin 30 which is rotatably received within a bearing 32 positioned in a bearing cavity 34 centered in the bottom of the chamber 26. An operating shaft 36 is axially centrally disposed on the body member and extends upwardly therefrom through a central opening 38 in the cover flange. The shaft 36 has a reduced diameter portion 40 which forms a shoulder 42 on the shaft and has a further reduced diameter portion 44 on which an operating handle 46 is affixed as by means of a key and keyway 48.

The body member 28 carries within it a conduit section 50 which is rotatable with the body member. As shown in the drawing, the conduit section 50 is a smoothly bent tubular member having a length such that it extends from closely adjacent one of the ports 16 to closely adjacent another port 14. The ends of the conduit member are not sealingly engaged with the walls of the housing surrounding the ports, but are spaced slightly away so that no contact is made. Preferably, the conduit member is welded or similarly affixed within the body member 28 and the space between the conduit member and the walls of the body member may be filled with plastic, rubber or some other material to prevent fluid in the pipeline from stagnating in this area.

A stuffing box 52 is sealingly received within the opening 38 in the cover flange 22. A thrust washer 54 is positioned between the end of the stuffing box and the shoulder 42 on the shaft 36. The stuffing box is of conventional construction consisting of packing 56 and a gland 58, and is attached to the cover flange by means of cap screws 60.

In the embodiment shown, the operating handle 46 is of angular shape and is provided with a double-ended arrow 61 thereon indicating the orientation of the conduit 50. The operating handle is also provided with apertures 62 in its ends through which a cap screw 64 may be threaded to engage one of three nuts 66 affixed to the cover flange over each of the ports 12, 14 and 16. Thus when the operating handle is turned so as to align the conduit 50 with, for example, ports 14 and 16, the cap screw 64 may be screwed into one of the nuts 66 to secure the operating handle and therefore the conduit 50 in position.

It will be seen that with the three ports positioned 120° apart and a 120° bend in the conduit 50, a pig moving through the diverter may be caused to move in any of six directions: from port 12 to either of 14 and 16, from port 14 to either of 12 and 16, and from port 16 to either of 12 and 14.

The invention may also be incorporated in diverters for use at junctions of more than three lines although with not as much flexibility possible. For example, if four pipelines intersect, a conduit with a 90° bend can be used only for connecting adjacent pipelines and not for connecting opposite pipelines. However, substantial flexibility still is inherent in the structure in allowing eight way movement of a pig through the intersection.

The conduit is preferably spaced only about 1/32 inch to 1/16 inch from the wall of the housing so as to substantially reduce the flow of fluid around the body member 28 when the conduit is aligned with two ports. Although the body member is not quite as close to the wall of the housing, it still allows only a comparatively small area through which fluid may flow to bypass the conduit. Thus when the conduit is aligned with two ports and a pig is within the conduit, being forced therethrough by fluid pressure, a substantial pressure drop exists for fluid which bypasses the conduit so that sufficient pressure drop exists to insure that the pig is forced through the conduit.

Yet it is undesirable to fully close off fluid flow when the conduit is being rotated from one position to another since valves are normally used in the pipeline to take care of proper diversion of fluids into the desired lines. Thus, as shown in the drawing, the diameter of the conduit is greater than the space between adjacent ports in the housing, so that fluid flow through the conduit may continue while the conduit is being rotated from one position to another.

Although a preferred embodiment of the invention has been shown and described herein, the invention is not limited to such embodiment, but the scope of the invention is defined only by the claims appended hereto.

We claim:

1. A pig diverter for use at the intersection of at least three pipe lines, comprising:
    a housing having a port for connection to each pipe line,
    said ports being substantially equiangularly spaced around said housing,
    a conduit rotatably mounted within said housing for selectively connecting a pair of said ports,
    said conduit being in the form of a pipe section smoothly curved in an axial direction, and
    means connected to said conduit for rotating it within the housing,
    the diameter of the conduit being greater than the space between adjacent ports in the housing, whereby fluid flow may be maintained through the conduit while it is being rotated from one position to another.

2. A pig diverter as defined by claim 1 wherein:
    the housing has three ports susbtantially 120 degrees apart.

3. A pig diverter as defined by claim 1 and including:
    a fluid-flow area in said housing around the conduit,
    the ends of the conduit being in non-sealing relationship with the wall of the housing around the ports, whereby a by-pass fluid passage is formed around said conduit,
    the ends of the conduit being close enough to the wall of the housing to restrict flow around the conduit enough to cause a substantial pressure differential across the diverter when a pig is in the conduit so that the pig will be forced out of the conduit by the pressure differential.

4. A pig diverter as defined by claim 1 and including:
    shaft means affixed to said conduit normal to the axis thereof,
    operating means connected to said shaft means for rotating the conduit with said housing,
    means connected to and movable with said operating means to indicate the orientation of said conduit, and
    lock means engageable with said operating means to lock the shaft means to maintain a desired orientation of said conduit.

5. A pig diverter as defined by claim 4 wherein:
    the housing has three ports substantially 120 degrees apart.

6. A pig diverter as defined by claim 4 and including:
    a fluid-flow area in said housing around the conduit,
    the ends of the conduit being in non-sealing relationship with the wall of the housing around the ports, whereby a by-pass fluid passage is formed around said conduit,
    the ends of the conduit being close enough to the wall of the housing to restrict flow around the conduit enough to cause a substantial pressure differential across the diverter when a pig is in the conduit so that the pig will be forced out of the conduit by the pressure differential.

7. A pig diverter for use at the intersection of at least three pipe lines, comprising:
    a housing having a port for connection to each pipe line,
    a conduit rotatably mounted within said housing for selectively connecting a pair of said ports,
    said conduit being in the form of a pipe section,
    means connected to said conduit for rotating it within the housing,
    the diameter of the conduit being greater than the space between adjacent ports in the housing, whereby fluid flow may be maintained through the conduit while it is being rotated from one position to another,
    a fluid-flow area in said housing around the conduit,
    the ends of the conduit being in non-sealing relationship with the wall of the housing around the ports, whereby a by-pass fluid passage is formed around each conduit,
    the ends of the conduit being close enough to the wall of the housing to restrict flow around the conduit enough to cause a substantial pressure differential across the diverter when a pig is in the conduit so that the pig will be forced out of the conduit by the pressure differential.

References Cited
UNITED STATES PATENTS

| | | | |
|---|---|---|---|
| 1,496,259 | 6/1924 | Fairlie | 137—625.47 XR |
| 1,725,337 | 8/1929 | Burkhard | 137—625.47 XR |
| 2,000,552 | 5/1935 | Zaikowsky | 137—625.47 XR |
| 2,442,553 | 6/1948 | Stienen | 137—625.47 |
| 3,047,020 | 7/1962 | Barrett | 137—625.46 |

HENRY T. KLINKSIEK, Primary Examiner

U.S. Cl. X.R.

15—104.06; 137—625.47